United States Patent [19]

Anderson

[11] Patent Number: 4,566,086
[45] Date of Patent: Jan. 21, 1986

[54] INFORMATION STORAGE SYSTEM UTILIZING ELECTRETS

[75] Inventor: Jeff L. Anderson, Cambridge, Ohio

[73] Assignee: NCR Corporation, Dayton, Ohio

[21] Appl. No.: 503,447

[22] Filed: Jun. 13, 1983

[51] Int. Cl.[4] .............................................. G11B 11/08
[52] U.S. Cl. ...................... 369/13; 369/110; 369/126; 365/146
[58] Field of Search ................. 369/13, 126, 110, 100, 369/101, 111; 365/146, 121

[56] References Cited

U.S. PATENT DOCUMENTS

| 3,276,031 | 9/1966 | Gaynor | 365/146 |
|---|---|---|---|
| 3,445,824 | 5/1969 | Fulenwider | 365/146 |
| 3,660,818 | 5/1972 | Amodei | 365/146 |
| 3,794,986 | 2/1974 | Murayama | 365/146 |
| 4,125,860 | 11/1978 | Ishii | 369/110 |
| 4,139,908 | 2/1979 | Brody | 369/13 |
| 4,512,940 | 4/1985 | Anderson | 361/233 |

Primary Examiner—Alan Faber
Attorney, Agent, or Firm—Wilbert Hawk, Jr.; Richard W. Lavin

[57] ABSTRACT

A system for reading and storing data includes a rotating transparent substrate having a layer of dielectric material disposed thereon. A movable support member positioned adjacent one side of the substrate includes a radiant energy source and an electrical field generator which, when energized, produces an electret in the dielectric material when heated to an electret forming temperature by the radiant energy source and which polarizes light rays from the radiant energy source in a direction representing a binary value. An optical detector mounted on a support member adjacent the opposite side of the substrate detects the presence or absence of the polarized light and generates electrical signals representing such conditions. The electrical field generator includes a plurality of pole members for producing an electret having more than one plane of polarization, each of which represents a different binary value.

11 Claims, 4 Drawing Figures

INFORMATION STORAGE SYSTEM UTILIZING ELECTRETS

CROSS-REFERENCE TO RELATED APPLICATIONS

"A Method And Apparatus For the Production of Electret Material", co-pending application Ser. No. 450,311, filed Dec. 16, 1982, invented by Jeff L. Anderson now U.S. Pat. No. 4,512,940

BACKGROUND OF THE INVENTION

The present invention relates to the recording of information and more particularly to an apparatus for reading and writing information using an electret material.

With the use of electrical computers and other information handling systems increasing at a rapid rate, the demand for a simple, economical and high-speed apparatus for storing large amounts of information has also increased. As a result of this demand, various information storage processes have been investigated. One of these processes has involved the use of "electrets" as the medium for storing electrical charges. As described in U.S. Pat. No. 3,445,824, issued to J. E. Fulenweider on May 20, 1969, a semiconductor information storage device includes a matrix array of rows and columns of conductors disposed on opposite sides of a sheet of dielectric material with the dielectric material in the local regions of cross-overs of the conductors defining bit locations in which information is stored by first heating up the dielectric material at the bit locations and then applying an electrical potential difference between the row and column conductors thereat, while the dielectric material is hardened to form a permanent polarization core electret representing a binary 1 state. The absence of an electret at a bit location represents a binary 0 state. In U.S. Pat. No. 3,276,031, issued to J. Gaynor on Sept. 27, 1966, deformations are formed in a deformable electret layer representing the information to be recorded. The drawback with these prior art storage systems is that their use becomes increasingly difficult as the data density requirement increases. The reading and writing of electret charges in this manner will require proportionately smaller electrode assemblies, thereby increasing the complexity of their circuitry and requiring more sensitive electronics. Because of these problems, older techniques rapidly lose their utility as they reach their limits in either storage density or read-write speed. It is therefore the principal object of this invention to provide an improved system for storing binary information. It is a further object of this invention to provide an improved system for the reading and writing of data on a low-cost, high-capacity storage medium.

SUMMARY OF THE INVENTION

These and other objects of the invention are fulfilled by fabricating a recording disk comprising a layer of transparent dielectric material disposed on a transparent disk-shape substrate. Associated with the disk is a movable support member which moves across opposite surfaces of the disk. Mounted on the support member on one side of the substrate is a source of radiant energy together with an aligned electrical field generator. Mounted on the support member adjacent the opposite side of the substrate and aligned with the radiant energy source and the electrical field generator is an optical detector for detecting the presence or absence of polarized light.

In writing a data bit in one embodiment of the invention, the radiant energy is focused at a spot on the rotating disk through an opening in the electrical field generator which supplies an electrical field to the area of the dielectric material intercepting the beam of radiant energy. The intensity of the beam of radiant energy raises the temperature of the dielectric material to a level where electrical polarization of the material take place, producing an electret representing one value of a binary bit. The materials and the intensity and direction of electrical polarization are chosen such that the presence of an electret will cause plane polarization of light passing through it. In reading the information stored on the disk, the radiant energy is again focused on the surface of the disk at an intensity which is lower than that which had occurred during a write operation. Upon striking the location on the disk which comprises an electret, the light is polarized by the electret and the detector will detect the polarized light and generate an electrical signal representing the recorded binary value.

In a second embodiment, the electret is formed being polarized in offset directions in which each direction will polarize the radiant energy in a plane representing a different binary value.

BRIEF DESCRIPTION OF THE DRAWINGS

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
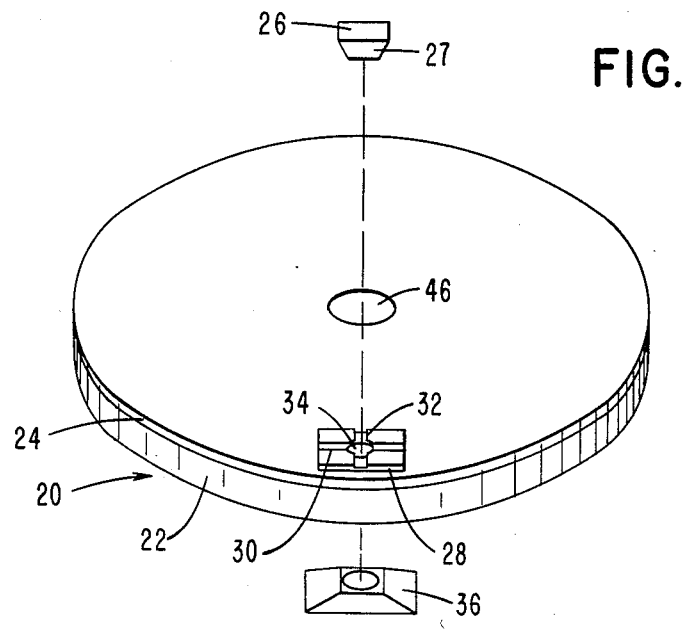
FIG. 1 is a schematic representation of an oblique view of the apparatus for writing and reading data stored on an optical disk member.

Referring to FIG. 1, there is shown a schematic representation of the apparatus for reading and writing data on an optical disk generally indicated by the numeral 20 and comprising a transparent substrate 22 such as glass on which is deposited a layer of dielectric material 24 susceptible of becoming an electret. Materials known as "electret" are those prepared by maintaining a film, sheet or other shaped particle of a plastic composed of a polymeric or organic material such as carnauba wax or naphthalene; a polar resin such as polyfluorovinylidene resin, a polyvinyl chloride resin, polycarbonate, polyester, and acrylic resin, etc.; a non-polar resin such as polyethylene, polypropylene, polystyrene, etc. or copolymers of them; or a mixture of these materials at a suitable temperature for a period of time under the application of a D.C. potential and cooling the dielectric material while maintaining the D.C. potential resulting in the electrical polarization of the material forming the electret and in a condition wherein radiant energy striking the electret will be optically polarized by the electret as the radiant energy is transmitted through the electret. The optical polarization of the radiant energy occurs in the same plane as the electrical polarization of the electret. This latter characteristic is controlled by the direction of the electrical field applied to the heated dielectric material.

Figure 3:
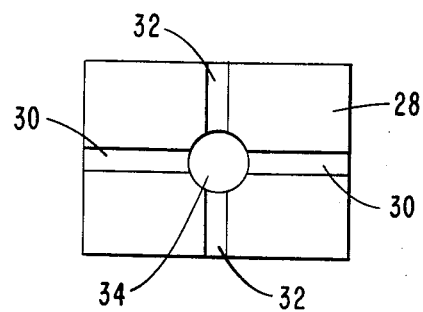
FIG. 3 is a plan view of the electrical field generator showing the orientation of the pole members for generating an electrical field in a direction offset by 90 degrees to each other.

Associated with the disk 20 is a source of radiant energy such as an infrared lamp assembly 26 which includes a lens member 27 for focusing the radiant energy of the lamp on the surface of the electret established in the material 24. Aligned with the lamp assembly 26 and positioned adjacent the surface of the dielectric material 24 is an electrical field generator 28 (FIGS. 1 and 3) which includes a pair each of electrode or pole members 30 and 32 orientated to generate an electrical field in a plane offset by 90 degrees to each other. Each of the pole members 30 and 32 is connected to a suitable power supply (not shown) which may be selectively controlled to energize the pole members when required. Located in the center of the generator 28 is an aperture 34 which, as shown in FIG. 1, allows the radiant energy to be focused on the surface of the dielectric material 24.

Aligned with the lamp assembly 26 and the aperture 34 of the generator 28 is a polarized light detector 36 located adjacent the lower surface of the transparent disk 20. As previously described, generating an electret in the dielectric material 24 results in the optical polarization of the material, allowing the electret to polarize the light being transmitted thereto in a plane according to the plane of polarization of the electret itself. In the present application, the detector 36 will sense the plane of the polarized light received through the substrate 22 if an electret is present in the dielectric material 24 on the disk 20 and generate an electrical signal whose signal level indicates the plane of the polarized light detected.

Figure 2:
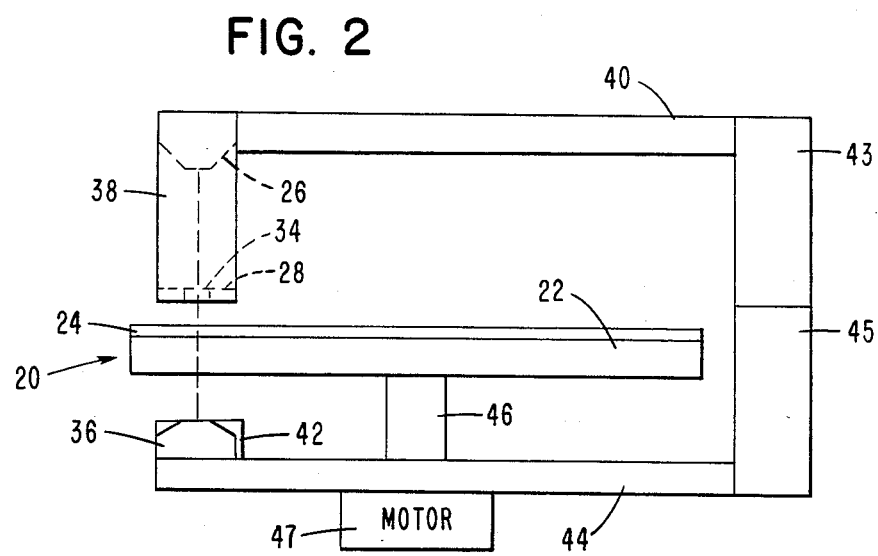
FIG. 2 is a schematic representation of a side view of the apparatus for effecting the storage of information on the optical disk member.

Referring now to FIG. 2, there is shown a schematic representation of a side view of the supporting structure for the lamp assembly 26, the electrical field generator 32 and the polarized light detector 36. Included in this structure is an elongated support member 38 which is movably supported on a track member 40 for radial movement along the surface of the disk 20. The support member 38 supports the lamp assembly 26 in registry with the electrical field generator 28 enabling the radiant energy generated by the lamp assembly to pass through the aperture 34 of the generator 28 to a position on dielectric material 24 on the upper surface of the disk 20. A second support member 42 located adjacent the lower surface of the disk 20 supports the polarized light detector 36 and is movably mounted on a second track member 44 located in the plane of movement of the lamp assembly 26. Both support members 38 and 42 are driven in unison along their respective track members by any conventional drive means such as motorized leadscrews 43, 45 or the like. The disk 20 is secured to a drive shaft 46 which is operated by a motor 47 in a conventional manner.

Figure 4:
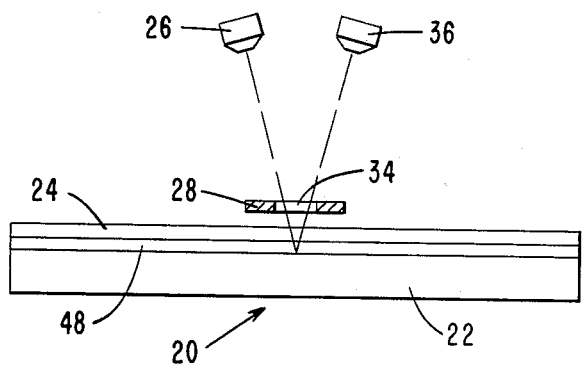
FIG. 4 is a schematic representation of the second embodiment of the apparatus for effecting the storage of information on the optical disk member.

Referring now to FIG. 4, there is shown a schematic representation of a second embodiment of the present invention in which the lamp assembly 26 and the polarized light detector 36 are mounted in an appropriate support member, such as 38, and in the same horizontal plane adjacent the top surface of the disk 20. The lamp assembly 26 and the polarized light detector 36 are oriented with respect to the surface of the disk 20 so that the radiant energy emanating from the lamp assembly 26 will be directed through the aperture 34 of the generator 28 and through an electret formed in the dielectric material 24. The radiant energy is polarized by the electret and then reflected back to the detector 36 from a dielectric mirror 48 applied to the surface of the substrate 22 but below the electret formed in the material 24. It is further obvious that the substrate 22 can be constructed of a reflective material, thereby eliminating the need for the mirror 48.

In writing data such as a binary 1 or 0 on the disk 20, the level of the intensity of the radiant energy generated by the lamp assembly 26 is established which will heat the dielectric material 24 above the temperature where an electret may be formed if the area is subject to an electrical field. Upon the temperature reaching the preselected temperature, and electrical field is generated by energizing one pair of the pole pieces 30 or 32 of the electrical field generator 28 to establish an electret at that position. In one embodiment, the electret will have a polarization in only one direction, according to which of the poles 30 or 32 of the generator 28 has been energized.

In reading the data represented by the electret so formed in this manner, the lamp assembly 26 generates an energy beam at an intensity level which is lower than the intensity level required to generate an electret. If the electret is present at the time the generated beam strikes the surface of the material 24, the light beam will be transmitted through the electret in a polarized condition to the detector 36 which converts the sensed polarized light beams into an electrical signal representing the appropriate binary logical signal. If an electret is not present at the location at this time, the lack of a signal by the detector represents a second binary logical signal. In the preferred embodiment of the present invention, an electret will be formed at each location with the electret being polarized in one direction by the poles 30 (FIG. 3) representing one binary value or in the other direction by the poles 32 representing the other binary value. The polarized light detector 36 is capable of sensing the polarization of the light in either direction to output different signals representing the binary values.

To change the binary value stored in the dielectric material 24, the lamp assembly 26 is again operated at an electret forming intensity level with the radiant energy forces directed at the electret to be changed. By not generating an electrical field, the electret will be eliminated. If a different plane of polarization is desired, generating the desired electric field will reform the electret to represent the new binary value. It will be seen from this construction that the use of a combination of optical and electronic sensing means achieves high density data recording which can be achieved at a relatively low cost and high rate of speed.

Numerous modifications and adaptions of the system of the present invention will be apparent to those skilled in the art, including, without limitation, physical makeup and configuration of the substrate 22, and thus it is intended by the appended claims to cover all such modifications and adaptions which fall within the true spirit and scope of this invention.

I claim:

1. A system for storing and reading coded information comprising:

a rotating substrate having coated on one side a layer of dielectric material for the type in which electrets may be induced;

a source of radiant energy located adjacent the layer of dielectric material and operated at a first intensity level which increases the temperature of the dielectric material on which the radiant energy is projected to an electret-forming condition;

an electrical field generator means positioned between the layer of dielectric material and the source of radiant energy for generating a coplanar electrical field within said layer, said generator means including an aperture aligned with said radiant energy source for enabling the radiant energy source to heat the dielectric material adjacent the aperture and thereby form an electret extending in a direction parallel to the surface of the dielectric material upon operation of the generator means;

and first means located adjacent said substrate slidably supporting said radiant energy source and said field generator means for movement in a direction across the substrate enabling a plurality of electrets to be formed in said dielectric material representing coded information.

2. The system of claim 1 in which said substrate is transparent; and source of radiant energy is operated at a second intensity level which will not raise the temperature of the dielectric material to an electret-forming condition; and said system further including radiant energy detecting means positioned adjacent the other side of the substrate in alignment with said source of radiant energy and said generator means aperture for generating electrical signals in response to detecting the presence or absence of an electret in said dielectric material when the radiant energy source is operated at said second intensity level and second means slidably supporting said detecting means for movement in unison with said first supporting means enabling said detecting means to read the coded information formed in the dielectric material adjacent said aperture through said substrate.

3. The system of claim 2 in which said field generator means comprises a pair of electrode members extending in a direction parallel to the top surface of the dielectric material and offset to each other by a predetermined angle to generate a plurality of electrical fields with each field establishing a plane of polarization in the electret extending in a direction parallel to the electrode members for polarizing the radiant energy.

4. The system of claim 3 in which said detecting means is constructed to generate an electrical signal in accordance with the plane of polarized radiant energy detected.

5. The system of claim 4 in which said electrode members are offset by 90 degrees to each other.

6. The system of claim 1 in which said source of radiant energy is also operated at a second intensity level which will not raise the temperature of the dielectric material to an electret-forming condition; said substrate is constructed to reflect radiant energy operated at said second intensity level; and said system further including radiant energy detecting means supported by said first slidably supporting means and aligned with respect to said aperture for enabling said detecting means to detect radiant energy reflected back through said aperture by said substrate when an electret is formed in the dielectric material adjacent said aperture.

7. A system for storing and reading coded information comprising:

a transparent substrate coated on one side with a film of dielectric material of the type in which electrical polarization of an electret may be induced;

a first support member mounted adjacent the film of dielectric material and adapted for lateral movement across the substrate;

a light source mounted on said first support member for generating a light beam having a first intensity level which increases the temperature of the dielectric material to an electret-forming level;

means mounted on said first support member for focusing the light beam of said light source on a surface area of the film of dielectric material;

an electrical field generator mounted on said first support member between said light source and said film of dielectric material for generating a coplanar electrical field within said film of dielectric material at said light beam focused surface area, said generator including an aperture aligned with said light source and said focusing means for enabling said focusing means to focus the light beam on the surface area of the dielectric film for forming an electret thereat extending in a direction parallel to the surface of the dielectric material upon operation of said generator;

means for rotating said substrate;

and means for actuating said first support member for moving said light source and said generator across the rotating substrate whereby an electret is formed at the surface area in said dielectric material representing coded information upon the operation of said generator.

8. The system of claim 7 in which said light source generates a light beam having a second intensity level which does not increase the temperature of the dielectric material to an electret-forming level; and said system further including a second support member mounted adjacent the other residue of the substrate and adapted for movement in unison with said first support member, and a light detector mounted on said second support member and aligned with said aperture and said light source for generating electrical signals in response to detecting the plane of polarized light outputted by said light source operated at said second intensity level and transmitted through said substrate by an electret located in said dielectric material adjacent said aperture.

9. The system of claim 8 in which said electrical field generator comprises a pair of oppositely-positioned electrode members offset to each other by a predetermined angle.

10. The system of claim 9 in which said electrode members are offset by 90 degrees to each other.

11. The system of claim 7 in which said substrate includes a layer of light-reflecting material applied to the surface of the substrate beneath the layer of dielectric material, said light source generates a light beam having a second intensity level which does not increase the temperature of the dielectric material to an electret-forming condition, said system further including a light detector mounted on said first support member and aligned with respect to said aperture for generating electrical signals in response to detecting the plane of polarized light outputted by said light source operated at said second intensity level and transmitted by an electret in said dielectric material located adjacent said aperture, said polarized light being reflected back through said aperture by said reflecting layer to the detector.

* * * * *